P. W. DEUEL.
EGG SUPPORT.
APPLICATION FILED APR. 15, 1916.
1,204,654.
Patented Nov. 14, 1916.
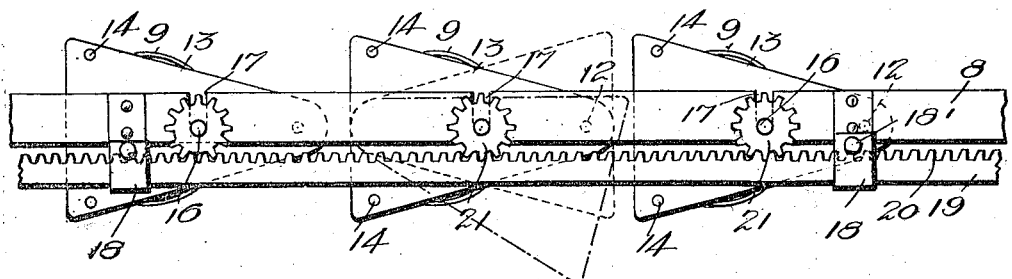
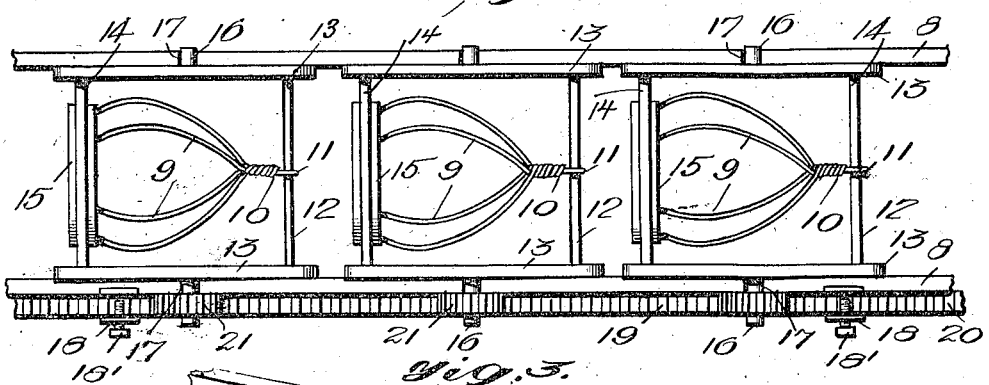
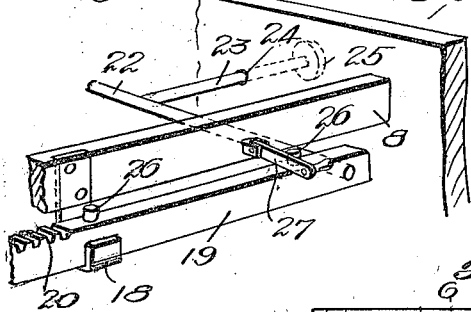
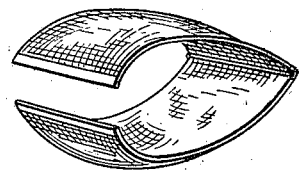
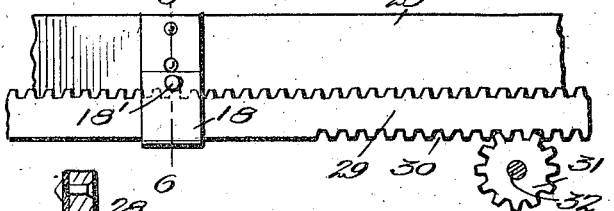
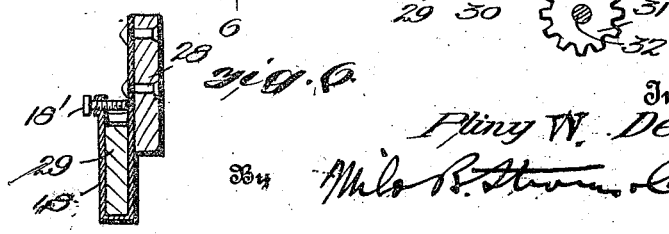

UNITED STATES PATENT OFFICE.

PLINY W. DEUEL, OF MELROSE PARK, ILLINOIS, ASSIGNOR OF ONE-HALF TO FREDERICK C. WHITMORE, OF CHICAGO, ILLINOIS.

EGG-SUPPORT.

1,204,654.  Specification of Letters Patent.  Patented Nov. 14, 1916.

Application filed April 15, 1916. Serial No. 91,351.

*To all whom it may concern:*

Be it known that I, PLINY W. DEUEL, a citizen of the United States, residing at Melrose Park, in the county of Cook and State of Illinois, have invented new and useful Improvements in Egg-Supports, of which the following is a specification.

This invention relates to incubators and has as its object to provide an improved tray construction whereby all the eggs may be readily and properly turned without the necessity of turning each egg separately.

It is one aim of the invention to so construct the egg pockets of the device that the same will not in any way interfere with the incubation of the egg or the hatching of the chick.

Another aim of the invention is to so construct the device that all of the eggs in the tray will be turned with certainty and yet without likelihood of the eggs being discharged from the egg pockets, the means being, however, capable of adjustment to permit of slight overturning of the pockets beyond the ordinary limits so that, at the hatching period, the pockets may readily discharge the shells as they are opened by the chicks.

A further aim of the invention is to so construct and mount the egg pockets of the tray and the actuating means therefor that both may be removed conveniently and cleaned after the hatching period and before refilling of the tray.

The invention also contemplates the provision of means for preventing displacement of the actuating bars for the egg pockets while the pockets are being turned during the period of incubation.

In the accompanying drawings, Figure 1 is a side elevation of a portion of one of the units of the tray embodying the present invention, one of the egg pockets being shown in full lines in one position, in dotted lines in reverse position, and in dot and dash lines in the position which they are caused to assume at or near the end of the hatching period; Fig. 2 is a top plan view of a portion of one of the units; Fig. 3 is a fragmentary perspective view of a portion of the tray illustrating the means provided for limiting the movement of the devices for turning the egg pockets; Fig. 4 is a perspective view of a slightly modified form of egg pocket; Fig. 5 is a side elevation of one of the bars comprising one of the units, and Fig. 6 is a vertical transverse sectional view on the line 6—6 of Fig. 5.

Mounted within the incubator, in parallel relation, are pairs of supporting bars 8 which serve to support between them the egg pockets in the manner which will now be explained.

In that form of the invention shown in Figs. 1 to 3 of the drawings, the egg pockets are formed out of wire and each of the pockets is substantially of conoidal form so as to conform to the contour of one end of the egg to be contained therein. Each of the pockets, in this form of the invention, is formed from a plurality of strands of wire which are indicated by the numeral 9 and which are bent to the proper curve to form the sides of the pocket. The strands at one end are twisted together as indicated by the numeral 10 so as to close the minor end of the pocket, and, beyond their twisted portions, the strands are bent to form an eye 11 which receives a cross pin 12 extending between the corresponding ends of plates 13 between which the pocket is supported. The said plates are preferably of substantially triangular form and the ends of the cross pins 12 are secured in the apices of the plates.

The numeral 14 indicates a pair of cross pins which are mounted at their ends in the plates 13 at the corners of the bases thereof and mounted between these pins 14 is an annulus 15 to which, at points equi-distantly spaced, are secured the ends of the wires 9 which are at the open ends of the pockets. It will be understood of course that the annulus 15 defines the mouth of the egg receiving pocket.

In order that each of the egg pockets may be supported for turning movement, the side plates 13 of each pocket are provided with trunnions 16 which rest in bearing notches 17 formed in the upper edges of the supporting bars 8.

At suitable intervals, one of the bars 8 of each pair is provided with brackets 18 which receive and support a rack bar 19 the teeth of which are indicated by the numeral 20. The trunnions of the egg pockets at the corresponding side of the unit are provided with pinions 21 which mesh with the teeth of the rack bar and which are to impart turning motion to the egg pockets upon reciprocation of the said rack bar. At this point it will be observed that all of the egg pockets are so mounted in their bearings that they may be individually removed and cleaned and that the rack bars themselves may also be removed from their supporting brackets 18. In order that all of the rack bars of the tray may be simultaneously reciprocated, the forward ends of the said bars are preferably connected by a cross rod 22 which at some convenient point in its length is provided with a shank 23 which extends through an opening 24 in the wall of the incubator housing, and which is provided with a knob 25 whereby the cross rod and the rack bars connected therewith may be moved, and this without removing the egg supporting units from the incubator casing.

In order to limit the reciprocatory movement of the rack bars 19 one of the bars, preferably adjacent the shank 23, is provided with suitably spaced upstanding lugs 26 and a keeper 27 is pivoted to the adjacent supporting bar 8 and is adapted to be swung downwardly to normally rest by gravity upon the upper edge of the said rack bar and in position to coöperate with the studs 26 for the purpose stated. It will be understood however that the keeper may be swung upwardly so as to permit movement of the rack bars past the limits imposed by the said studs in their engagement with the keeper so that, while during the earlier period of incubation the egg pockets are limited in their turning movements as indicated by the full and dotted line showing of the drawings, whereas at the end of the hatching period they may be caused to further turn or tilt to assist in the discharge of the shell from the pocket at the time of egress of the chick.

In that form of the invention shown in Fig. 4 of the drawings, the egg pocket is formed from wire mesh material and shaped as shown in the said figure.

In order that the rack bars 19 may be held against upward displacement in their reciprocatory movement, screws or pins 18' are adjustably fitted through the outer sides of the brackets 18 and extend above the upper edges of the rack bars.

In that form of the invention illustrated in Figs. 5 and 6 of the drawings, the supporting bars are indicated by the numeral 28 and the rack bars by the numeral 29, and each of the said rack bars is provided upon its under side with teeth 30. Meshing with the teeth 30 of all of the rack bars are pinions 31 carried by a shaft 32 which at its end may be provided with a crank (not shown) or other actuating means.

While the present invention is defined primarily for use in connection with incubators, it will be understood that the principles thereof may be embodied in egg trays of various sorts and that modifications may be resorted to without departing from the spirit of the invention as set forth in the claims.

I claim:—

1. In an egg support, spaced supporting bars, egg pockets mounted for turning movement between the said bars, a member movable to turn the said pockets, and means for limiting the movement of the said member, the said means being arranged to be rendered inactive whereby the pockets may have turning movement beyond initial limits.

2. In an egg support, supporting members provided with open bearings, open brackets carried by one of said members, a rack bar removably and slidably mounted in the said brackets, egg pockets having trunnions received within the said bearings, pinions carried by the trunnions at one side of the egg pockets and meshing with the said rack bar, and means carried by one of the brackets for preventing displacement of the rack bar therefrom.

3. In an egg support, spaced supporting members, egg pockets supported for turning movement between the said members, a reciprocating member having operative connection with the egg pockets for turning the same when the said member is reciprocated, and means for restraining reciprocation of the said member within predetermined limits, the said means being adapted to be rendered inactive to permit of further movement of the said member.

In testimony whereof I affix my signature.

PLINY W. DEUEL.